United States Patent [19]

Huang

[11] Patent Number: 4,696,450
[45] Date of Patent: Sep. 29, 1987

[54] FAN MOTOR ASSEMBLY SUPPORT FRAME

[76] Inventor: Kuo C. Huang, No. 17, Hsin Ren Road, An-Ping District, Tainan, 000

[21] Appl. No.: 848,266

[22] Filed: Apr. 4, 1986

[51] Int. Cl.⁴ ............................................. F16M 1/00
[52] U.S. Cl. ..................................... 248/661; 248/278
[58] Field of Search ............... 248/661, 278, 122, 674, 248/183; 310/91; 416/244 R, 246

[56] References Cited
U.S. PATENT DOCUMENTS

| 751,485 | 2/1904 | Eck | 416/246 X |
| 1,670,056 | 5/1928 | Winters | 416/246 X |
| 1,956,614 | 5/1934 | Engelhardt | 248/661 X |
| 2,303,553 | 12/1942 | Humphreys | 248/661 |

FOREIGN PATENT DOCUMENTS

| 6867 | of 1914 | United Kingdom | 416/246 |
| 205630 | 10/1923 | United Kingdom | 248/661 |
| 854885 | 11/1960 | United Kingdom | 248/487 |

Primary Examiner—Franklin J. Foss
Attorney, Agent, or Firm—Steinberg & Raskin

[57] ABSTRACT

A suppport frame comprising a primary and secondary frame. The primary frame is U-shaped, having a hole on each end and a disc-like central section with a plurality of pits and a cylindrical projection. The secondary frame has a seat with a circular recess on one end and an engaging device on the other end. The motor assembly is disposed between the tips of the U-shaped frame by screws. The base of the fan, together with the control panel, engages with the engaging device by screws. The seat of the secondary frame with its circular recess receives the cylindrical projection of the primary frame and they are coupled together with a screw. Two sets of a spring and ball are placed respectively within two apertures on the seat of the secondary frame to coincide with the pits on the disc. Thus, the primary frame may be adjusted relative to the secondary frame.

11 Claims, 3 Drawing Figures

FAN MOTOR ASSEMBLY SUPPORT FRAME

BACKGROUND OF THE INVENTION

The present invention relates to an improved support frame for fan motor assemblies.

Although air-conditioners are presently popular in many places, they are expensive and require large amount of energy, and thus are not suitable in many countries. The fan, however, provides similar relief from heat without the expense and energy required by air-conditioners, and therefore are still very useful in many places.

Coventional electrical fans can swing only limited angles and cover limited area, therefore restricting its usefulness.

SUMMARY OF THE INVENTION

The present invention seeks to provide an improved support frame for electrical fan motor assemblies, allowing optional rotation of the motor assembly, together with the impeller, possible, thus increasing the overall usefulness of the fan.

DETAILED DESCRIPTION OF THE PREFERRED EMBODIMENT

Figure 1:
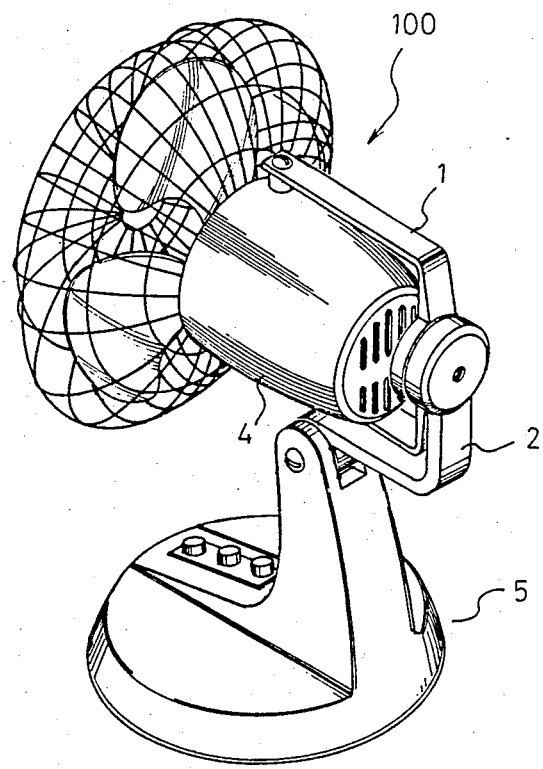
FIG. 1 shows a perspective view of the present invention.
Figure 2:
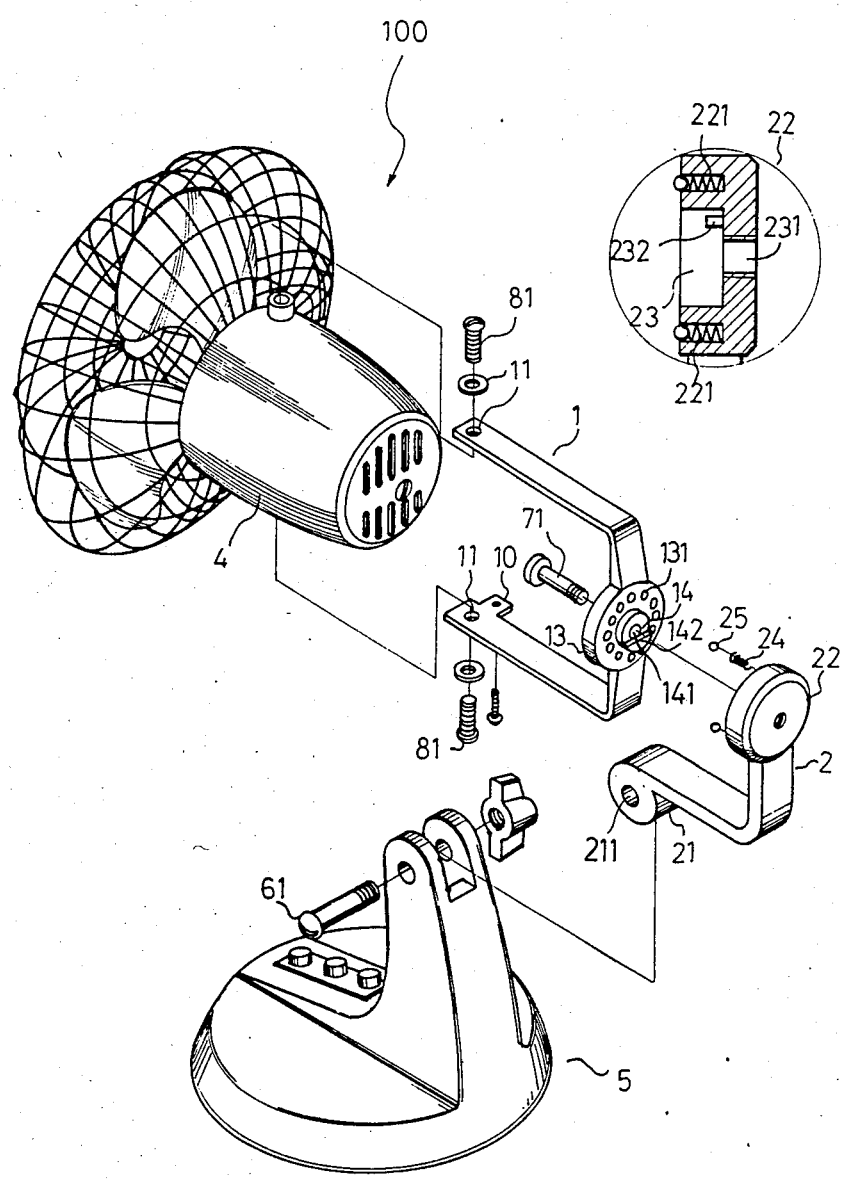
FIG. 2 shows a fragmental view of the present invention.
Figure 3:
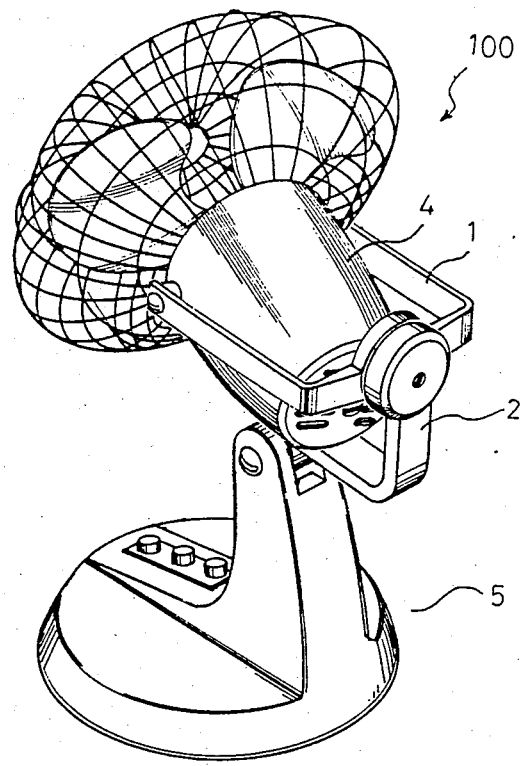
FIG. 3 shows another perspective view of the present invention.

Referring to the drawings, in particular to FIGS. 1 and 2, an electrical fan 100 comprises a motor assembly 4, together with impeller structure, a primary and secondary frame (1 and 2) and a base 5.

The motor assembly 4 and the base 5 are the same as the corresponding parts of a conventional electrical fan, and therefore will not be described herein.

The first frame 1 is U-shaped with a disc-shaped portion 13 in its center section and has holes 11 on each end of the "U". The motor assembly 4 is disposed between the two ends of the "U" by means of the holes 11 and screws 81. In order to more securely fix the motor assembly 4, there may be provided a lateral projection 10 on one end of the U-shaped frame 1, having a centered hole and fixing means to further support the motor assembly 4. Projecting from the disc 13 is a concentric cylinder 14 which further has a bow-shaped projection 142 extending therefrom with the arc surface being coincident with the cylindrical surface of the cylinder 14. A plurality of pits 131, in which balls 25 may engage to angularly position the motor assembly 4, are disposed concentrically around the cylinder 14. A hole 141 goes through the center of the disc 13 and receives a screw bolt 71.

The secondary frame 2 has a seat 22 for the cylinder 14 of the primary frame at one end, and an engaging member 21 at the other end. The seat 22 has a circular recess 23, into which the cylinder 14 of the primary frame 1 is inserted, and a threaded centered hole 231 which receives the screw 71. On the annular platform of the seat 22, there is a plurality of apertures 221, preferably two, each of which receives a spring 24 and a ball 25. There is also a small protrusion 232 on the recess 23, which in conjunction with the bow-shaped projection 142 limits the rotation of the primary frame 1 relative to the secondary frame 2 to 180 degrees both clockwise and the counterclockwise directions.

The engaging member 21 is, preferably, a cylindrical wheel with a concentric hole 211. It can be easily understood that the engaging member 21 can engage with the base 5 of the electrical fan 100 by means of screw 61 as in a conventional fan support.

With the springs 24 and balls 25 disposed within the apertures 221, the angular position of the primary frame 1 relative to the secondary frame 2 can be easily adjusted and with the disposition of the protrusion 232 and the bow-shaped projection 142, the angular position of the primary frame 1 relative to the secondary frame 2 is 180° in either the clockwise or the counterclockwise direction, so that the electrical wire is not damaged.

With such a structure according to the present invention, the air stream produced by the impeller of the fan can be directed to any position in front of the fan 100, thus increasing the usefulness of the electrical fan.

It is to be understood that the present invention is not limited into application to the details of construction and arrangement of parts illustrated in the accompanying drawings and the description put down hereinbefore, since the invention is capable of other embodiments and of being practiced or carried out in numerous ways. Also, it is to be understood that the phraseology or terminology employed herein is for the purpose of description and not of limitation.

I claim:

1. A fan assembly, comprising
   a fan,
   motor means coupled to said fan for rotating said fan with respect to a first fan axis of rotation,
   a motor housing in which said motor means are housed,
   primary frame means coupled to said motor housing for permitting pivotal movement of said motor housing and primary frame means with respect to each other around a second axis which is substantially perpendicular to said first fan axis of rotation,
   secondary frame means coupled to said primary frame means for permitting pivotal movement of said primary frame means and secondary frame means with respect to each other around a third axis which lies substantially in the same plane as and which is substantially perpendicular to said second axis, and
   a base on which said secondary frame means are mounted.

2. The assembly of claim 1, wherein said primary frame means are substantially in the shape of a U.

3. The assembly of claim 2, wherein said primary frame means additionally comprise means for coupling the same to said motor housing at ends of said U.

4. The assembly of claim 2, wherein said primary frame means additionally comprise means for rotatably coupling the same to said pivotal means of said secondary frame means.

5. The assembly of claim 4, wherein said rotatably coupling means comprise
   a disc-shaped element situated substantially at a middle of said U,
   said disc-shaped element comprising a substantially cylindrical extension substantially centered thereon, a plurality of pits disposed substantially concentrically about said cylindrical extension, and a hole extending substantially along a center axis and through said disc-shaped element and cylindrical extension for receiving a screw bolt therethrough, and said pivotal means of said secondary frame means comprise a seat situated at an end of said secondary frame means, said seat comprising a substantially circular recess substantially coincident with said cylindrical extension, a plurality of apertures on a circumferential platform of said seat about said recess, a spring and ball being inserted into each said respective aperture, and a threaded hole extending through said seat and communicating with a center bottom portion of said recess for receiving the screw bolt therein, said cylindrical extension being insertable into said matching recess and rotatably secured therein by said screw bolt, with said spring loaded balls within said respective apertures engaging said pits on said disc-shaped element with position of said primary and secondary frame means being rotatably adjustable with respect to one another.

6. The assembly of claim 5, wherein said seat of said secondary frame means has a protrusion disposed in said recess, and said cylindrical extension on said disc-like element of said primary frame means has a projection extending therefrom, the rotation of said primary frame means relative to said secondary frame means being therefore restricted to about 180 degrees of rotation in clockwise and counterclockwise directions.

7. The assembly of claim 5, wherein said secondary frame means additionally comprise
means for mounting the same upon said base at an end opposite the end thereof at which said seat is situated.

8. The assembly of claim 7, wherein said secondary frame means are substantially L-shaped.

9. The assembly of claim 8, wherein said mounting means of said secondary frame means comprise a cylindrical portion having a hole therethrough at said respective end.

10. The assembly of claim 6, wherein said coupling means on said primary frame means comprise a lateral projection on one end thereof having a substantially centered hole and fixing means for further supporting said motor housing to more securely support the same.

11. The assembly of claim 6, wherein said projection extending from said cylindrical extension is substantially bow-shaped with an arc surface substantially coincident with a surface of said cylindrical extension.

* * * * *